United States Patent
Bai et al.

(10) Patent No.: US 9,684,512 B2
(45) Date of Patent: Jun. 20, 2017

(54) ADAPTIVE MAP-REDUCE PIPELINE WITH DYNAMIC THREAD ALLOCATIONS

(71) Applicant: International Business Machines Corporation, Armonk, NY (US)

(72) Inventors: Wen Yan Bai, Beijing (CN); Xiao Ming Bao, Beijing (CN); Zhenhua Hu, Toronto (CA); Jian Liu, Beijing (CN); Haohai Ma, Markham (CA)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 14/672,781

(22) Filed: Mar. 30, 2015

(65) Prior Publication Data
US 2016/0291977 A1 Oct. 6, 2016

(51) Int. Cl.
| | |
|---|---|
| *G06F 3/00* | (2006.01) |
| *G06F 5/00* | (2006.01) |
| *G06F 13/36* | (2006.01) |
| *G06F 9/30* | (2006.01) |
| *G06F 5/14* | (2006.01) |
| *G06F 9/48* | (2006.01) |
| *G06F 3/06* | (2006.01) |
| *G06F 12/0806* | (2016.01) |

(52) U.S. Cl.
CPC ........ *G06F 9/30079* (2013.01); *G06F 3/0604* (2013.01); *G06F 3/0638* (2013.01); *G06F 3/0656* (2013.01); *G06F 3/0673* (2013.01); *G06F 5/14* (2013.01); *G06F 9/3009* (2013.01); *G06F 9/4881* (2013.01); *G06F 12/0806* (2013.01); *G06F 2205/126* (2013.01); *G06F 2212/62* (2013.01)

(58) Field of Classification Search
CPC .............................. H04L 41/046; H04L 67/10
USPC ............................... 710/56, 30, 52, 306, 310
See application file for complete search history.

(56) References Cited

U.S. PATENT DOCUMENTS

| | | | |
|---|---|---|---|
| 2002/0171864 A1* | 11/2002 | Sesek | G06K 15/00 358/1.15 |
| 2003/0084255 A1* | 5/2003 | Suzuki | G06F 13/1605 711/150 |

(Continued)

OTHER PUBLICATIONS

Sevilla et al. "SupMR: Circumventing Disk and Memory Bandwidth Bottlenecks for Scale-up MapReduce", provided on search report dated 1024-10-30.

(Continued)

*Primary Examiner* — Idriss N Alrobaye
*Assistant Examiner* — Getente A Yimer
(74) *Attorney, Agent, or Firm* — Isaac J. Gooshaw

(57) ABSTRACT

In an approach to adaptively pipeline a MapReduce job, a processor receives one or more data records from a storage and inserts the one or more data records into a map queue, wherein a size of the map queue is adaptive to one or more utilizations of one or more resources in the processor. One or more processors apply a map function to the one or more data records in the first buffer and sort the records that are output from the map function and store the sorted records. One or more processors receive and insert the sorted records into a reduce queue, wherein a size of the reduce queue is adaptive to one or more utilizations of resources in the one or more processors. One or more processors apply a reduce function to the sorted records in the reduce queue and store a result in a storage.

18 Claims, 7 Drawing Sheets

(56) References Cited

U.S. PATENT DOCUMENTS

| | | | | |
|---|---|---|---|---|
| 2013/0021646 | A1* | 1/2013 | Ichikawa | G06K 15/1822 358/1.15 |
| 2014/0181831 | A1* | 6/2014 | Le Scouarnec | G06F 9/5027 718/104 |
| 2014/0215178 | A1* | 7/2014 | Li | G06F 9/5066 711/173 |
| 2015/0074216 | A1* | 3/2015 | Park | H04L 67/10 709/208 |

OTHER PUBLICATIONS

IBM, "IBM Solution for Hadoop—Power Systems Edition", provided by inventor on Dec. 2, 2015, <http://www-03.ibm.com/systems/power/solutions/bigdata-analytics/hadoop/>.

IBM, "IBM Solution for Hadoop—Power Systems Edition", An IBM Reference Architecture for InfoSphere® BigInsights™, V1.0, Apr. 30, 2014, © Copyright IBM Corporation 2014, pp. 1-30, Grace Period Disclosure Document.

IBM, "IBM Solution for Hadoop—Power Systems Edition", An IBM Reference Architecture for InfoSphere® BigInsights™, V2.0, Sep. 26, 2014, © Copyright IBM Corporation 2014, pp. 1-35, Grace Period Disclosure Document.

"Using flexible slots and cross-assignment to increase MapReduce resource utilization", An IP.com Prior Art Database Technical Disclosure, Authors et. al.: Disclosed Anonymously, IP.com No. 000234081, IP.com Electronic Publication: Jan. 10, 2014, pp. 1-7.

U.S. Appl. No. 14/860,562 Entitled "Adaptive Map Reduce Pipeline With Dynamic Thread Allocations", filed Sep. 21, 2015.

Appendix P—"List of IBM Patents or Patent Applications Treated as Related".

* cited by examiner

ADAPTIVE MAP-REDUCE PIPELINE WITH DYNAMIC THREAD ALLOCATIONS

The following disclosure(s) are submitted under 35 U.S.C. 102(b)(1)(A) as prior disclosures by, or on behalf of, a sole inventor of the present application or a joint inventor of the present application:

(i) "IBM Solution for Hadoop—Power Systems Edition", An IBM Reference Architecture for InfoSphere® BigInsights™, V1.0, Apr. 30, 2014, ©Copyright IBM Corporation 2014, pages 1-30.

(ii) "IBM Solution for Hadoop—Power Systems Edition", An IBM Reference Architecture for InfoSphere® BigInsights™, V2.0, Sep. 26, 2014, ©Copyright IBM Corporation 2014, pages 1-35.

BACKGROUND OF THE INVENTION

The present invention relates generally to the field of database systems, and more specifically to database systems that follow a MapReduce framework.

MapReduce is a programming model for processing large data sets, and the name of an implementation of the model by Google. MapReduce is typically used to do distributed computing on clusters of computers. The model is inspired by the "map" and "reduce" functions commonly used in functional programming. MapReduce comprises a "Map" step wherein the master node establishes a division of a problem in map tasks that each handle a particular sub-problem and assigns these map tasks to worker nodes. For this, a scheduling master splits the problem input data and assigns each input data part to a map task. An input part is often referred to as a split. The worker nodes process the sub-problems according to a map( ) function provided by a user, and notify the master node upon map task completion. MapReduce further comprises a "Reduce" step wherein the master node assigns a "reduce" operation to some worker nodes, which collect the answers to all the sub-problems and analyze them, using a reduce( ) function provided by the user, to form the output—the answer to the problem it was originally trying to solve.

MapReduce allows for distributed processing of the map and reduction operations. Provided each mapping operation is independent of the others, the maps can be performed in parallel. Similarly, a set of 'reducers' can perform the reduction phase. While this process can appear inefficient compared to algorithms that are more sequential, MapReduce can be applied to significantly larger datasets than "commodity" servers can handle—a large server farm can use MapReduce to sort a petabyte of data in only a few hours; MapReduce is typically suited for the handling of 'big data'. The parallelism also offers some possibility of recovering from partial failure of servers or storage during the operation: if one mapper or reducer fails, the work can be rescheduled—assuming the input data is still available.

A significant design challenge associated with large complex systems that run MapReduce jobs is the efficient utilization of system resources, principally CPU cycles and memory, on a spectrum of jobs that vary greatly in their size and nature.

SUMMARY

Aspects of an embodiment of the present invention disclose a method and a program product, adaptively pipelining a MapReduce job. The method includes receiving, by a processor, into a first memory buffer, one or more data records from a storage, wherein a size of the first memory buffer is adaptive to one or more utilizations of one or more resources in the processor. The method further includes, inserting, by a processor, the first memory buffer into a first queue, wherein a size of the first queue is adaptive to one or more utilizations of one or more resources in the processor. The method further includes, generating, by one or more processors, one or more output records from the first memory buffer in the first queue by applying a map function to the one or more data records in the first memory buffer. The method further includes, writing, by a processor, the one or more output records into a second memory buffer in a second queue, wherein the size of the second memory buffer and the size of the second queue is adaptive to one or more utilizations of one or more resources in the processor. The method further includes, deleting, by one or more processors, the first memory buffer from the first queue. The method further includes, generating, by one or more processors, one or more sorted records in the second memory buffer by sorting the one or more output records in the second memory buffer. The method further includes, writing, by a processors, the second memory buffer into a third queue, wherein the size of the third queue is adaptive to one or more utilizations of one or more resources in the processor. The method further includes, deleting, by one or more processors, the second memory buffer from the second queue. The method further includes, merging, by one or more processors, one or more sorted records in the second memory buffer into an output data file that is stored in storage. The method further includes, deleting, by one or more processors, the second memory buffer from the third queue. The method further includes, generating, by one or more processors. The method further includes, receiving, by one or more processors, an input data from a map stage of a MapReduce job into a memory region. The method further includes, inserting, by a processor, the input data in the memory region into one or more third memory buffers in a fourth queue, wherein a size of a third memory buffer in the one or more third memory buffers and the size of the fourth queue is adaptive to one or more utilizations of resources in the processor. The method further includes, generating, by one or more processors, one or more output records by applying a reduce function to an input data in a third memory buffer in the fourth queue. The method further includes, inserting, by a processor, the one or more output records into a fourth memory buffer in a fifth queue, wherein the size of the fourth memory buffer and the size of the fifth queue is adaptive to one or more utilizations of the one or more resources in the processor. The method further includes, writing, by one or more processors, the one or more output records in a fourth memory buffer in the fifth queue to storage. The method further includes, deleting, by one or more processors, the fourth memory buffer from the fifth queue.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention recognize that MapReduce jobs vary greatly in size and nature and that to efficiently utilize the computational resources of a map reduce system, appropriate sized units of work must be created and mapped to multiple threads of execution to execute the units of work in parallel. Additionally, the size of the data structures (e.g., memory buffers and queues) used in the flow of work and data in a MapReduce job must be dynamically adaptive to the nature of the work (e.g., CPU intensive, memory intensive, or storage intensive) and to the utilizations of various computer resources in the map reduce system.

Figure 1:
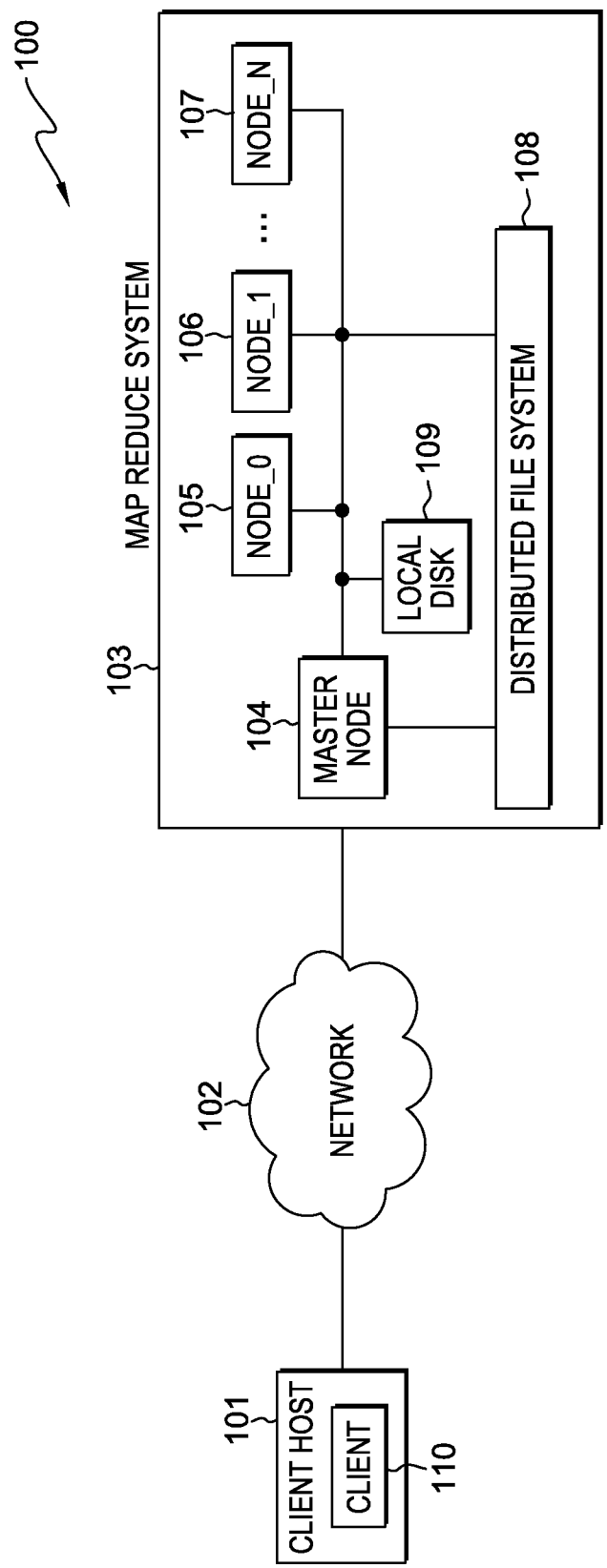
FIG. 1 depicts a block diagram of a portion of a computing complex, in accordance with an embodiment of the present invention.

FIG. 1 depicts system 100 that, in some scenarios and embodiments, includes client host 101, network 102, local disk 109, and map reduce system 103, in which client host 101 submits one or more MapReduce jobs over network 102 to map reduce system 103. In an embodiment, map reduce system 103 is comprised of master node 104, and n+1 worker nodes: node_0 105, node_1 106, and additional nodes through node_N 107. Master node 104 receives a job from client host 101 and partitions the job into map tasks, called splits, each map task handling a particular sub-problem, and assigns these map tasks to worker nodes node_0 105 through node_N 107. Master node 104, and node_0 105 through node_N 107 are connected to distributed file system 108 and to local disk 109. Master node 104 receives a MapReduce job from client 110 on client host 101 and partitions the job and distributes the partitions of the job to the computer nodes.

Figure 2:
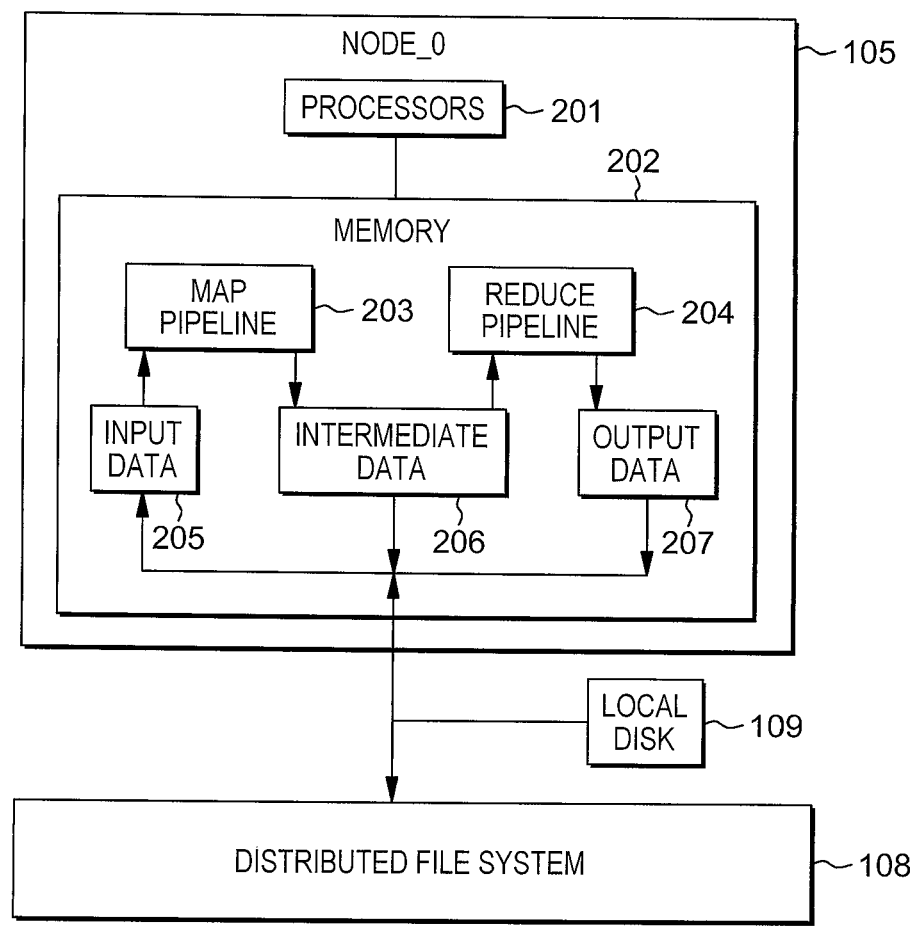
FIG. 2 depicts a block diagram of node_0 depicted in FIG. 1, in accordance with an embodiment of the present invention.

FIG. 2 depicts node_0 105 in detail. In some scenarios and embodiments, node_0 105 is comprised of processors 201 and memory 202. Memory 202 contains a software code and data structures that perform a MapReduce job: map pipeline 203, reduce pipeline 204, input data 205, intermediate data 206, and output data 207. Processors 201 access the software code and data structures in memory 202. Map pipeline 203 processes input data 205 that is fetched from local disk 109, processes input data 205, and produces intermediate data 206. Reduce pipeline 204 fetches intermediate data 206, processes it, and output data 207 writes the output data result to distributed file system 108.

Figure 3:
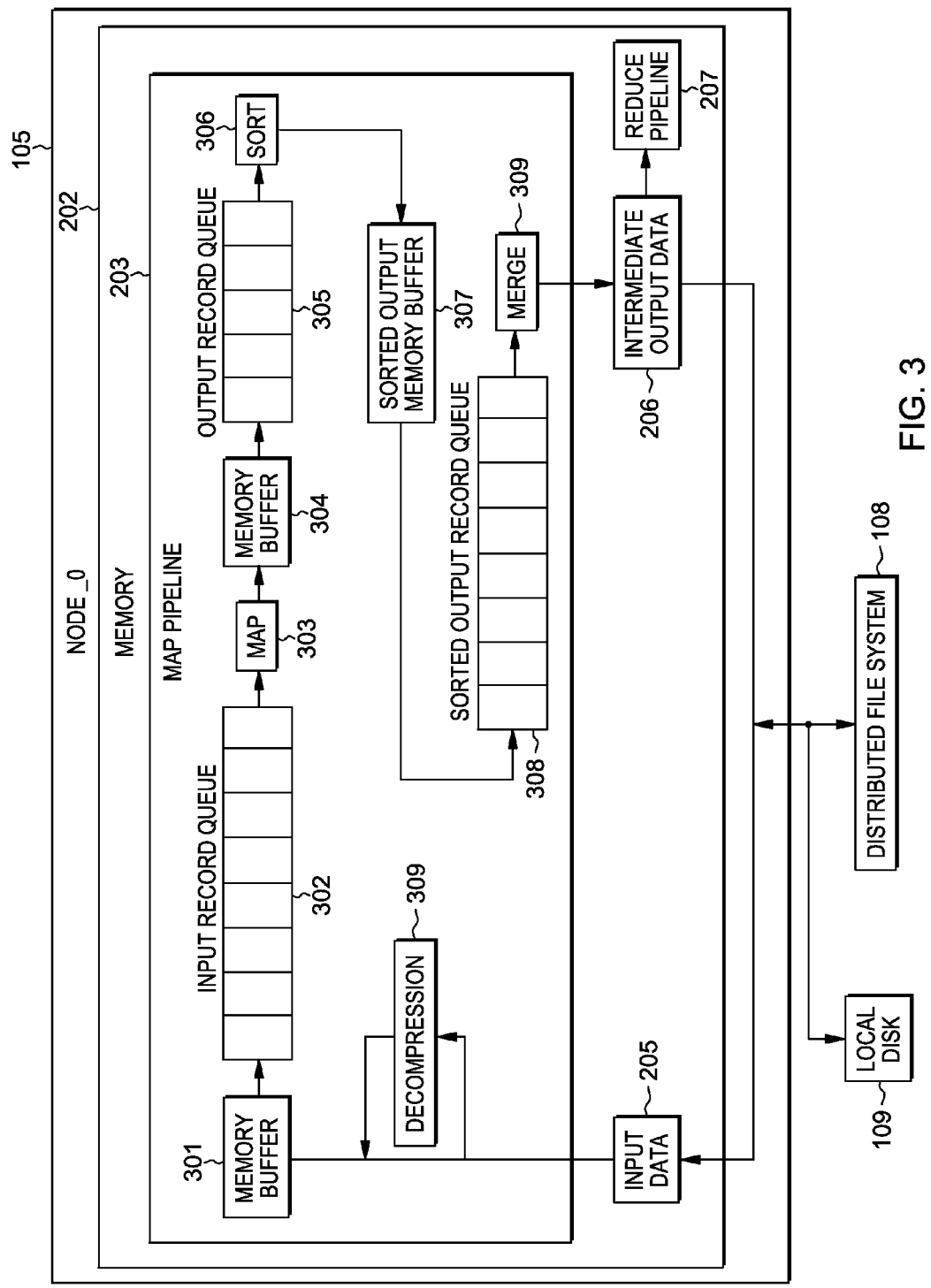
FIG. 3 depicts a detail of the map pipeline depicted in FIG. 2, in accordance with an embodiment of the present invention.

FIG. 3 depicts a detail of map pipeline 203. In some scenarios and embodiments, map pipeline 203 is comprised of decompression 309, memory buffer 301, input record queue 302, map 303, memory buffer 304, output record queue 305, sort 306, sorted output memory buffer 307, sorted output record queue 308, and merge 309 software functions. One or more input data records in local disk 109 are read into input data 205 in memory 202. The data records in input data 205 are transferred into memory buffer 301. If the data records in input data 205 are compressed, they are first decompressed in decompression 309 and then transferred to memory buffer 301. Memory buffer 301 is then inserted into the tail of input record queue 302. Input record queue 302 is a first-in-first-out queue. Map 303 processes the input records in the memory buffers in input record queue 302 one at a time. Map 303 takes a memory buffer at the head of output record queue 305 off the queue and processes the input records in the memory buffer. Map 303 applies a map( ) function that is provided by client 110 on client host 101 to the input records in the memory buffer that it takes off of the head of input record queue 302.

In some scenarios and embodiments, the size of memory buffer 301, and therefore the amount of data records that memory buffer 301 contains, is adaptively controlled to enhance the utilization of CPU resources in node_0 105 by decreasing the I/O time to fetch the data records from distributed file system 108. The size of memory buffer 301 is adjusted downward (i.e., decreased in size from large to small) until the processing of the data records in memory buffer 301 by map 303 begin before the processing of the amount data records in memory buffer 301 would otherwise begin had memory buffer 301 been larger and the utilization of CPU resources is enhanced. Map 303 can begin processing the data records in a smaller memory buffer 301 before map 303 can begin processing the data records in a larger memory buffer 301 because the smaller memory buffer 301 can be filled faster than the larger memory buffer 301 and therefore be inserted into input record queue 302 before a larger memory buffer 301. Because map 303 processes fewer input records in a smaller memory buffer 301 (when map 303 takes memory buffer 303 from input record queue 302), the processing by map 303 will complete sooner that the processing would have completed on a greater number of input records in a larger memory buffer 303.

In some scenarios and embodiments, the size of input record queue 302 (i.e., the number of memory buffers in it) is adaptively controlled to enhance CPU utilization by dynamically applying more compute threads to the processing by map 303 when the size of input record queue 302 grows beyond one or more specified size limits. Additionally, the number of compute threads applied to the processing by map 303 is dynamically decreased when the size of input record queue 302 decreases below one or more specified size limits to free the compute threads for other work.

In some scenarios and embodiments, map 303 generates one or more output records from the input records that map 303 receives from input record queue 302 and inserts the output records into memory buffer 304, which is inserted into the tail end of output record queue 305. In some scenarios and embodiments, the size of memory buffer 304, and therefore the amount of output data records that memory buffer 304 contains, is adaptively controlled to enhance the utilization of CPU resources in node_0 105. Output record queue 305 is a first-in-first-out queue that holds one or more memory buffers inserted by map 303. Each memory buffer contains one or more output records produced by a map( ) function defined by client 110 and applied to input records from input record queue 302.

In some scenarios and embodiments, sort 306 processes the output records in the memory buffers in output record queue 305 one at a time. Sort 306 takes a memory buffer at the head of output record queue 305 off the queue and processes the output records in the memory buffer. Sort 306 sorts the output records in the memory buffer and inserts the sorted output in sorted output memory buffer 307. Sorted output memory buffer 307 is inserted into the tail of sorted output record queue 308.

In some scenarios and embodiments, the size of output record queue 305 (i.e., the number of memory buffers in it) is adaptively controlled to enhance CPU utilization by dynamically applying more compute threads to the processing by sort 306 when the size of output record queue 305 grows beyond one or more specified size limits. Additionally, the number of compute threads applied to the processing by sort 306 is dynamically decreased when the size of output record queue 305 decreases below one or more specified size limits to free the compute threads for other work.

In some scenarios and embodiments, merge 309 takes one or more output data records from sorted output record queue 308, merges the one or more output data records into a consistent, complete record of intermediate output data and inserts the record of intermediate output data into intermediate output data 206. Intermediate output data 206 temporarily holds the record of intermediate output data. If the size of the record of intermediate output data is larger than a specified threshold, intermediate output data 206 compresses the record of intermediate output data. If reduce pipeline 204 is not ready to accept the record of intermediate output data, intermediate output data 206 stores the record of intermediate output data in local disk 109. If reduce pipeline 204 is ready to accept the record of intermediate output data, reduce pipeline 204 reads the record of intermediate output data from intermediate output data 206.

In some scenarios and embodiments, reduce pipeline 204 is not in the same compute node (e.g., node_0 105) that map pipeline 203 is in. In this case, intermediate output data 206 stores the record of intermediate output data in local disk 109 and then reduce pipeline 204 reads the record of intermediate output data from local disk 109 when reduce pipeline 204 is ready to process the record of intermediate output data.

Figure 4:
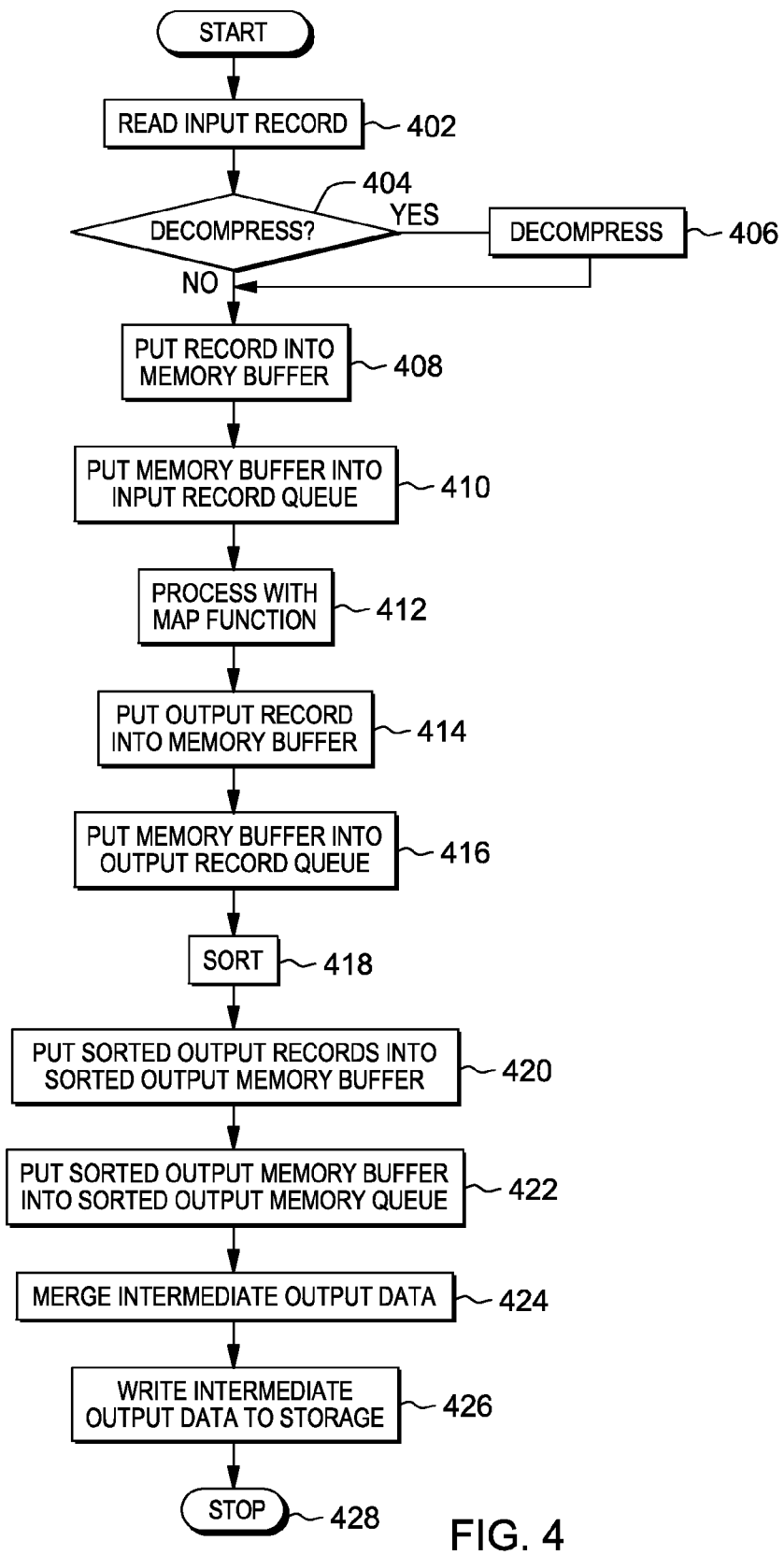
FIG. 4 depicts a flowchart of the operational steps of the map pipeline depicted in FIG. 3, in accordance with an embodiment of the present invention.

FIG. 4 depicts the operational steps performed by map pipeline 203, in an embodiment and scenario. Map pipeline 203 reads an input record (step 402) and decides if the input record must be decompressed in decision step 404. In decision step 404, if the input record must be decompressed (decision step 404, YES branch), then the input record is decompressed by decompression 309 (step 406) and put into memory buffer 301 (step 408). In decision step 404, if the input record does not have to be decompressed (decision step 404, NO branch), then the input record put into memory buffer 301 (step 408). Memory buffer 301 is put into input record queue 302 (step 410). Map 303 removes an input record from input record queue 302 and processes the input record with a map( ) function that is provided by client 110 (step 412) and included in the MapReduce job.

Map 303 produces an output record from the input record and inserts the output record into memory buffer 304 (step 414) and inserts memory buffer 304 into output record queue 305 (step 416). Sort 306 removes one or more memory buffers from output record queue 305, sorts the output data records in the one or more memory buffers (step 418), inserts the sorted output records into sorted output memory buffer 307 (step 420), and inserts sorted output memory buffer 307 into sorted output memory queue 308 (step 422). Merge 309 takes one or more output data records from sorted output record queue 308, merges the one or more output data records into a consistent, complete record of intermediate output data and inserts the record of intermediate output data into intermediate output data 206 (step 424). Intermediate output data 206 writes intermediate output data to storage by storing the record of intermediate output data in local disk 109 (step 426) and the processing of the input record by map pipeline 203 terminates (step 428).

Figure 5:
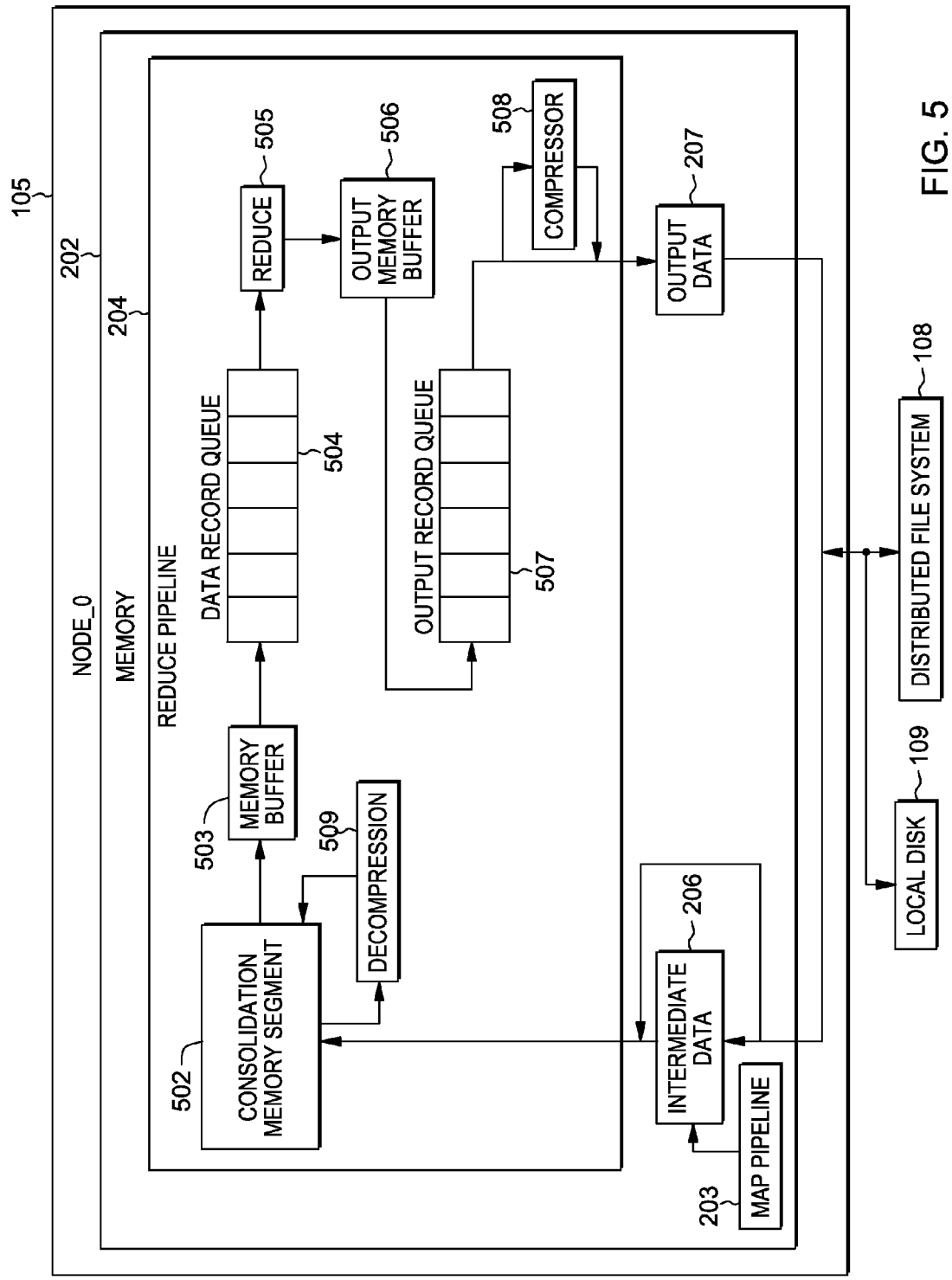
FIG. 5 depicts a detail of the reduce pipeline depicted in FIG. 2, in accordance with an embodiment of the present invention.

FIG. 5 depicts a detail of reduce pipeline 204. In some scenarios and embodiments, reduce pipeline 204 is comprised of consolidation memory segment 502, decompression 509, memory buffer 503, data record queue 504, reduce 505, output memory buffer 506, output records queue 507, and compressor 508. In an embodiment, reduce pipeline 204 and map pipeline 203 are both in node_0 105. In this case, intermediate output data is passed from map pipeline 203 to reduce pipeline within memory 202 through intermediate data 206. If intermediate data 206 contains one or more records of intermediate data produced by map pipeline 203, consolidation memory segment 502 fetches the one or more records and consolidates records that are related to the same reduce task into an input record. If the records of intermediate data are compressed, consolidation memory segment 502 decompresses the records with decompression 509. Consolidation memory segment 502 consolidates the one or more records that are related to the same map task together into an input record and inserts the input record into memory buffer 503.

In an embodiment, reduce pipeline 204 and map pipeline 203 are not in the same compute node. In this case, consolidation memory segment 502 fetches the one or more records of intermediate output data produced by map pipeline 203 from local disk 109 and, if the one or more records are compressed, decompresses the one or more records with decompression 509. Consolidation memory segment 502 consolidates the one or more records that are related to the same map task together into an input record and inserts the input record into memory buffer 503.

If map pipeline 203 and reduce pipeline 204 are both in node_105, the size of related data consolidator 501, and therefore the amount of input data records that related data consolidator 501 can contain, is adaptively controlled to enhance the utilization of CPU resources in node_0 105 by decreasing the I/O time to fetch the data records from local disk 109. Consolidation memory segment 502 consolidates the one or more records that are related to the same reduce task together into an input record and inserts the input record into memory buffer 503.

In some scenarios and embodiments, the size of consolidation memory segment 502, and therefore the amount of data records that consolidation memory segment 502 can contain, is adaptively controlled to enhance the utilization of CPU resources in node_0 105 by decreasing the I/O time to fetch the data records from local disk 109.

Memory buffer 503 is inserted into the tail of data record queue 504. Data record queue 504 is a first-in-first-out queue. Reduce 505 processes the input records in the memory buffers in data record queue 504 one at a time. Reduce 505 takes a memory buffer at the head of data record queue 504 off the queue and processes the input records in the memory buffer. Reduce 505 applies a reduce( ) function that is provided by client 110 on client host 101 to the data records in the memory buffer that reduce 505 takes from the head of data record queue 504.

In some scenarios and embodiments, the size of memory buffer 503, and therefore the amount of data records that memory buffer 503 contains, is adaptively controlled to enhance the utilization of CPU resources in node_0 105. The size of memory buffer 503 is adjusted downward (i.e., decreased in size from large to small) until the processing of the of the data records in memory buffer 503 by reduce 505 begin before the processing of the amount data records in memory buffer 503 would otherwise begin had memory buffer 503 been larger and the utilization of CPU resources is enhanced. Reduce 505 can begin processing the data records in a smaller memory buffer 503 before reduce 505 can begin processing the data records in a larger memory buffer 503 because the smaller memory buffer 503 can be filled faster than the larger memory buffer 503 and therefore be inserted into data record queue 504 before a larger memory buffer 503. Because reduce processes fewer data records in a smaller memory buffer 503 (when reduce 505 takes memory buffer 503 from data record queue 504), the processing by reduce 505 will complete sooner that the processing would have completed on a greater number of input records in a larger memory buffer 503.

In some scenarios and embodiments, the size of data record queue 504 (i.e., the number of memory buffers in it) is adaptively controlled to enhance CPU utilization by dynamically applying more compute threads to the processing by reduce 505 when the size of data record queue 504 grows beyond one or more specified size limits. Additionally, the number of compute threads applied to the processing by reduce 505 is dynamically decreased when the size of data record queue 504 decreases below one or more specified size limits to free the compute threads for other work.

In some scenarios and embodiments, reduce 505 generates one or more output records from the data records that reduce 505 receives from data record queue 504 and inserts the output records into output memory buffer 506, which is inserted into the tail end of output records queue 507. In some scenarios and embodiments, the size of output memory buffer 506, and therefore the amount of output data records that output memory buffer 506 contains, is adaptively controlled to enhance the utilization of CPU resources in node_0 105. Output records queue 507 is a first-in-first-out queue that holds one or more output memory buffers (e.g., output memory buffer 506) inserted by reduce 505. Each output memory buffer (e.g., output memory buffer 506) contains one or more output records produced by a reduce( ) function defined by client 110 and applied to data records from data record queue 504. One or more output memory buffers that contain the result of the MapReduce operation are extracted from the head of output records queue 507 by output data 207 and stored in distributed file system 108.

Figure 6:
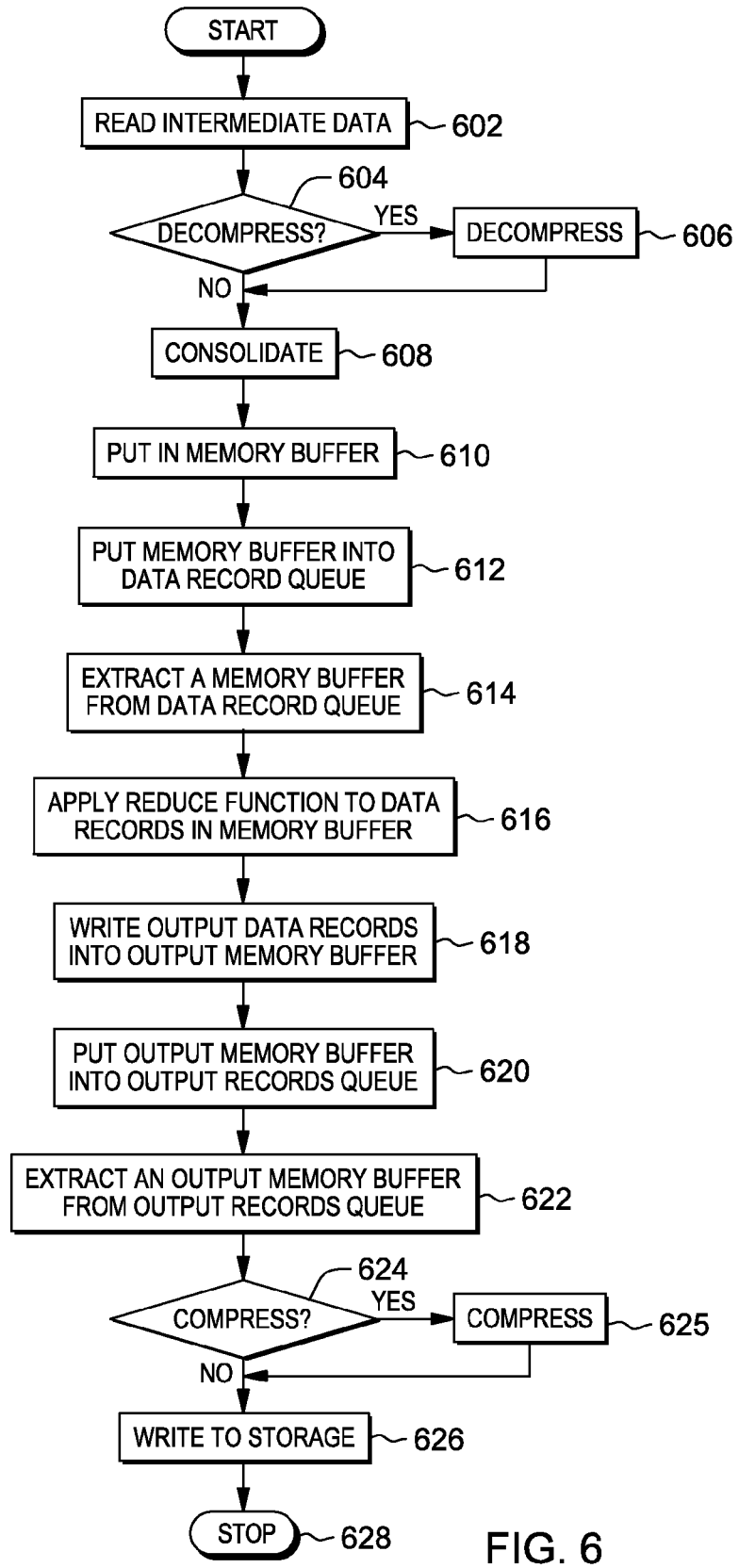
FIG. 6 depicts a flowchart of the operational steps of the reduce pipeline depicted in FIG. 5, in accordance with an embodiment of the present invention in FIG. 3, in accordance with an embodiment of the present invention.

FIG. 6 depicts the operational steps performed by reduce pipeline 204, in an embodiment and scenario. Consolidation memory segment 502 in reduce pipeline 204 reads intermediate data (step 602) and decides if intermediate data must be decompressed (decision step 604). In decision step 604, if the intermediate data must be decompressed (decision step 604, YES branch), then the input record is decompressed by decompression 509 (step 606). In decision step 604, if the intermediate data does not have to be decompressed (decision step 604, NO branch), then the input record is not decompressed by decompression 509.

Consolidation memory segment 502 consolidates the one or more records that are related to the same map task together into an input record (step 608) and inserts the input record into memory buffer 503 (step 610). Memory buffer 503 is inserted into the tail of data record queue 504 (step 612). Reduce 505 extracts a memory buffer from the head of data record queue 504 (step 614) and applies the reduce function reduce( ) to the data records in the memory buffer (step 616). Reduce 505 writes the output data records that reduce 505 generates from applying reduce( ) to the data records to output memory buffer 506 (step 618). Output memory buffer 506 is inserted into the tail of output records queue 507 (step 620). The output memory buffer at the head of output records memory buffer 507 is extracted (step 622) and if necessary (decision step 624, YES branch), is compressed (step 625) by compressor 508 and is not compressed if compression is not necessary (decision step 624, NO branch). The output memory buffer at the head of the output records queue 507 is then stored into distributed file system 103 by output data 207 (step 207). The MapReduce operation terminates (step 628).

Figure 7:
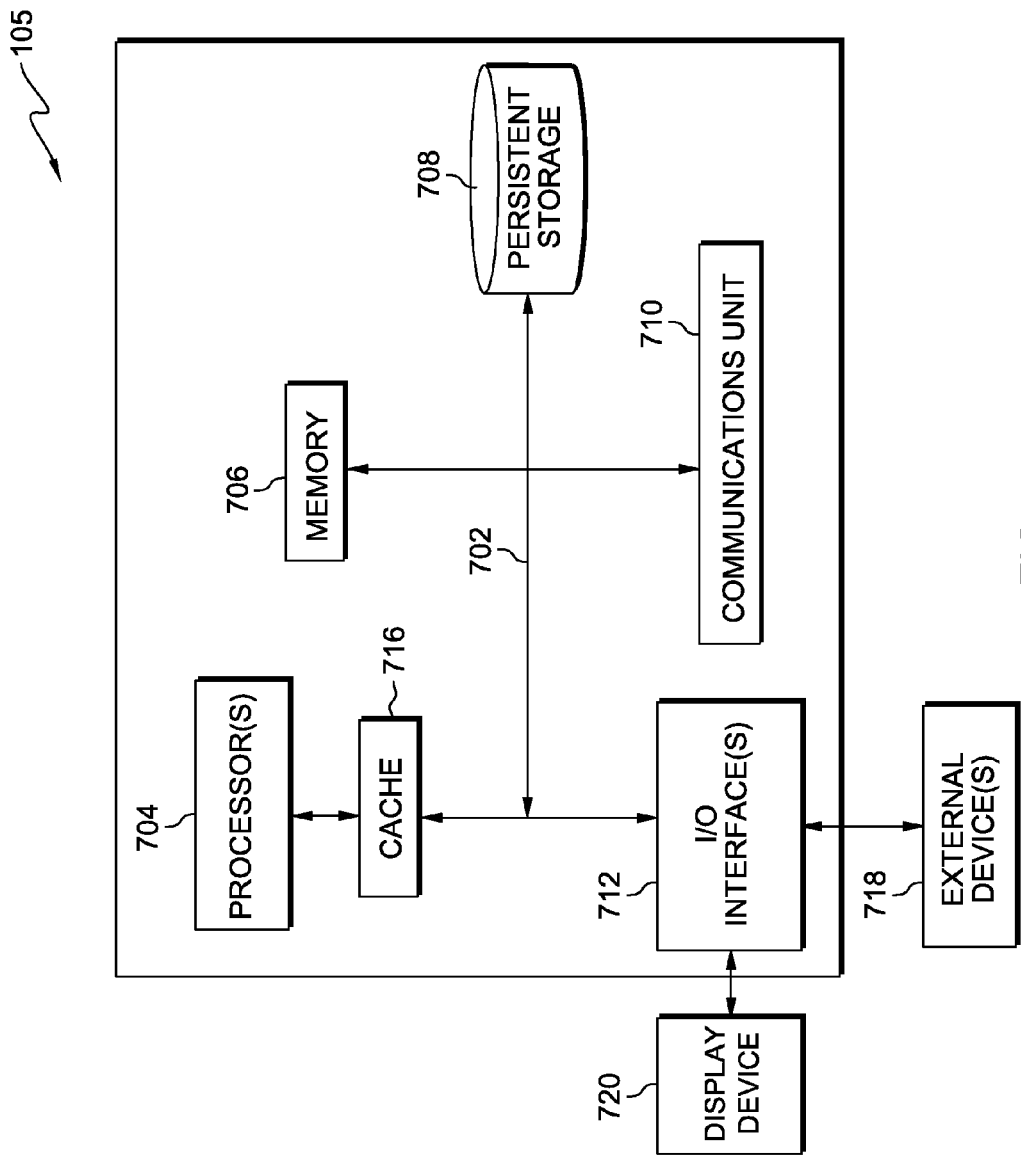
FIG. 7 depicts a block diagram of node_0 that incorporates the map pipeline depicted in FIG. 3 and the reduce pipeline depicted in FIG. 5, in accordance with an embodiment of the present invention.

FIG. 7 depicts an exemplary embodiment of node_0 105, which, in an embodiment, hosts map pipeline 203 and reduce pipeline 204. Node_0 105 includes processors 704 (which are processors 201), cache 716, and communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 (which is memory 202) and persistent storage 708 are computer readable storage media. In this embodiment, memory 706 includes random access memory (RAM). In an embodiment, memory 706 contains map pipeline 203, reduce pipeline 204, input data 205, intermediate data 206, and output data 207. In general, memory 706 can include any suitable volatile or non-volatile computer readable storage media. Cache 716 is a fast memory that enhances the performance of processors 704 by holding recently accessed data and data near accessed data from memory 706.

Program instructions and data used to practice embodiments of the present invention may be stored in persistent storage 708 for execution by one or more of the respective processors 704 via cache 716 and one or more memories of memory 706. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Program instructions and data used to practice embodiments of the present invention may be downloaded to persistent storage 708 through communications unit 710.

I/O interface(s) 712 allows for input and output of data with other devices that may be connected to each computer system. For example, I/O interface 712 may provide a connection to external devices 718 such as a keyboard, a keypad, a touch screen, and/or some other suitable input device. External devices 718 can also include portable computer readable storage media such as, for example, thumb drives, portable optical or magnetic disks, and memory cards. Software and data used to practice embodiments of the present invention can be stored on such portable computer readable storage media and can be loaded onto persistent storage 708 via I/O interface(s) 712. I/O interface(s) 712 also connects to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A computer program product to adaptively pipeline a map stage and a reduce stage of a MapReduce job, the computer program product comprising:
one or more computer readable storage hardware and program instructions stored on the one or more computer readable storage hardware, the program instructions comprising:
program instructions to receive into a first memory buffer, one or more data records from a storage, wherein a size of the first memory buffer is adaptive to one or more utilizations of one or more resources in a processor, wherein the processor is included in the one or more processors;
program instructions to insert the first memory buffer into a first queue, wherein a size of the first queue is adaptive to one or more utilizations of one or more resources in the processor;
program instructions to generate one or more output records from the first memory buffer in the first queue by applying a map function to the one or more data records in the first memory buffer;
program instructions to write the one or more output records into a second memory buffer in a second queue, wherein the size of the second memory buffer and the size of the second queue is adaptive to one or more utilizations of one or more resources in the processor;
program instructions to delete the first memory buffer from the first queue;
program instructions to generate one or more sorted records in the second memory buffer by sorting the one or more output records in the second memory buffer;
program instructions to respond to generation of one or more sorted records in the fourth buffer that overflow the fourth buffer, by executing a merge and spill of the one or more sorted records to storage;
program instructions to write the second memory buffer into a third queue, wherein the size of the third queue is adaptive to one or more utilizations of one or more resources in the processor;
program instructions to delete the second memory buffer from the second queue;
program instructions to merge one or more sorted records in the second memory buffer into a map data file that is stored in storage;
program instructions to delete the second memory buffer from the third queue;
program instructions to receive into a memory region an input data from the map data file stored in storage;
program instructions to insert the input data, included in the memory region, into one or more third memory buffers in a fourth queue, wherein a size of a third memory buffer in the one or more third memory buffers and the size of the fourth queue is adaptive to one or more utilizations of resources in the processor;
program instructions to generate one or more output records by applying a reduce function to an input data in a third memory buffer in the fourth queue;
program instructions to insert the one or more output records into a fourth memory buffer in a fifth queue, wherein the size of the fourth memory buffer and the size of the fifth queue is adaptive to one or more utilizations of the one or more resources in the processor;
program instructions to write the one or more output records in a fourth memory buffer in the fifth queue to storage; and
program instructions to delete the fourth memory buffer from the fifth queue.

2. The computer program product of claim 1, further comprising:
program instructions to adaptively schedule a number of threads to execute the map function to increase a utilization of the processor.

3. The computer program product of claim 1, further comprising
program instructions to adaptively schedule a number of threads to generate one or more sorted records to increase a utilization of the processor.

4. The computer program product of claim 1, further comprising:
program instructions to respond to a determination that an amount of free storage is less than a specified amount by compressing the one or more sorted records.

5. The computer program product of claim 1, further comprising:
program instructions to respond to a reception of an input data from the map data file and to respond to the input data overflowing the memory region, by merging the input data and spilling the input data to storage.

6. The computer program product of claim 1, further comprising:
program instructions to compress the one or more output records in the fourth memory buffer; and
program instructions to write the one or more records to storage.

7. The computer program product of claim 1, further comprising:
program instructions to adaptively schedule a number of threads to execute the reduce function such that there is an increase in a utilization of the processor.

8. The computer program product of claim 1, further comprising:
program instructions to adaptively schedule a number of threads to decompress the input data such that there is an increase in a utilization of the processor.

9. A computer program product to adaptively pipeline a map stage and a reduce stage of a MapReduce job, the computer program product comprising:
one or more computer readable storage hardware and program instructions stored on the one or more computer readable storage hardware, the program instructions comprising:
program instructions to receive an input data from a map stage of a MapReduce job into a memory region;
program instructions to insert the input data in the memory region into one or more third memory buffers in a fourth queue, wherein a size of a third memory buffer in the one or more third memory buffers and the size of the fourth queue is adaptive to one or more utilizations of resources in a processor, wherein the processor is included in the one or more processors;

program instructions to respond to i) a reception of an input data into a memory region and ii) to the input data overflowing the memory region, by merging the input data and spilling the input data to storage, wherein the input data originated from a map stage of a MapReduce job;

program instructions to generate one or more output records by applying a reduce function to an input data in a third memory buffer in the fourth queue;

program instructions to insert the one or more output records into a fourth memory buffer in a fifth queue, wherein the size of the fourth memory buffer and the size of the fifth queue is adaptive to one or more utilizations of the one or more resources in the processor;

program instructions to write the one or more output records in a fourth memory buffer in the fifth queue to storage; and program instructions to delete the fourth memory buffer from the fifth queue.

10. The computer program product of claim 9, comprising:
program instructions to respond to a reception of an input data from a map stage of a MapReduce job by decompressing the input data.

11. The computer program product of claim 9, comprising:
program instructions to compress the one or more output records in the fourth memory buffer; and
program instructions to write the one or more records to storage.

12. The computer program product of claim 9, comprising:
program instructions to adaptively apply a number of threads to execution of the reduce function such that there is an increase in a utilization of the processor.

13. The computer program product of claim 10, comprising:
program instructions to adaptively apply a number of threads to decompression of the input data such that there is an increase in a utilization of the processor.

14. A computer system to adaptively pipeline a map stage and a reduce stage of a MapReduce job, the computer system comprising:
one or more computer processors;
one or more computer readable storage hardware;
program instructions stored on the computer readable storage hardware for execution by at least one of the one or more processors, the program instructions comprising:

program instructions to receive an input data from a map stage of a MapReduce job into a memory region;

program instructions to insert the input data in the memory region into one or more third memory buffers in a fourth queue, wherein a size of a third memory buffer in the one or more third memory buffers and the size of the fourth queue is adaptive to one or more utilizations of resources in a processor, wherein the processor is included in the one or more processors;

program instructions to respond to i) a reception of an input data into a memory region and ii) to the input data overflowing the memory region, by merging the input data and spilling the input data to storage, wherein the input data originated from a map stage of a MapReduce job;

program instructions to generate one or more output records by applying a reduce function to an input data in a third memory buffer in the fourth queue;

program instructions to insert the one or more output records into a fourth memory buffer in a fifth queue, wherein the size of the fourth memory buffer and the size of the fifth queue is adaptive to one or more utilizations of the one or more resources in the processor;

program instructions to write the one or more output records in a fourth memory buffer in the fifth queue to storage; and
program instructions to delete the fourth memory buffer from the fifth queue.

15. The computer system of claim 14, comprising:
program instructions to respond to a reception of an input data from a map stage of a MapReduce job by decompressing the input data.

16. The computer system of claim 14, comprising:
program instructions to compress the one or more output records in the fourth memory buffer; and
program instructions to write the one or more records to storage.

17. The computer system of claim 14, comprising:
program instructions to adaptively apply a number of threads to execution of the reduce function such that there is an increase in a utilization of the processor.

18. The computer system of claim 15, comprising:
program instructions to adaptively apply a number of threads to decompression of the input data such that there is an increase in a utilization of the processor.

* * * * *